United States Patent

Hayashi et al.

[11] Patent Number: 5,754,708
[45] Date of Patent: May 19, 1998

[54] DOTTED IMAGE AREA DETECTING APPARATUS AND DOTTED IMAGE AREA DETECTING METHOD

[75] Inventors: Shinji Hayashi; Masaya Fujimoto; Hidechika Kumamoto, all of Osaka, Japan

[73] Assignee: Mita Industrial Co. Ltd., Osaka, Japan

[21] Appl. No.: 556,843

[22] Filed: Nov. 2, 1995

[30] Foreign Application Priority Data

| Nov. 16, 1994 | [JP] | Japan | 6-282226 |
| Nov. 16, 1994 | [JP] | Japan | 6-282227 |
| Nov. 29, 1994 | [JP] | Japan | 6-295390 |

[51] Int. Cl.$^6$ .................................................. H04N 1/40
[52] U.S. Cl. .................. 382/266; 382/264; 358/447; 358/462; 358/456
[58] Field of Search .................. 358/534, 533, 358/532, 453, 529, 540, 465, 456, 462, 447; 382/266, 264, 176

[56] References Cited

U.S. PATENT DOCUMENTS

| 4,893,188 | 1/1990 | Murakami et al. | 358/456 |
| 4,903,316 | 2/1990 | Hongo et al. | 382/272 |
| 5,014,124 | 5/1991 | Fujisawa | 358/530 |
| 5,177,795 | 1/1993 | Tanioka et al. | 382/270 |
| 5,392,139 | 2/1995 | Murata | 358/259 |
| 5,410,619 | 4/1995 | Fujisawa et al. | 382/254 |
| 5,448,651 | 9/1995 | Sakou et al. | 382/176 |
| 5,477,335 | 12/1995 | Tai | 358/529 |
| 5,568,571 | 10/1996 | Willis et al. | 382/176 |
| 5,617,485 | 4/1997 | Ohuchi et al. | 382/176 |
| 5,680,479 | 10/1997 | Wang et al. | 382/176 |

FOREIGN PATENT DOCUMENTS

| 100811 | 2/1984 | European Pat. Off. . |
| 411911 | 2/1991 | European Pat. Off. . |
| 566300 | 10/1993 | European Pat. Off. . |
| 60-178775 | 9/1985 | Japan . |
| 63-109656 | 5/1988 | Japan . |
| 2-110677 | 4/1990 | Japan . |
| 2-222074 | 9/1990 | Japan . |

OTHER PUBLICATIONS

English Abstract for Japanese Patent Appln. No. 60-178775.
European Search Report.

*Primary Examiner*—Edward L. Coles, Sr.
*Assistant Examiner*—Fan Lee
*Attorney, Agent, or Firm*—Beveridge, DeGrandi, Weilacher & Young, LLP

[57] ABSTRACT

An apparatus for and a method of reliably detecting a very small dotted image area. A detecting area including a predetermined number of pixels including a target pixel is set. It is judged whether or not the detecting area belongs to a dotted image area on the basis of the number of edge pixels in the detecting area. Consequently, it is possible to detect edges peculiar to the dotted image area on the basis of a leading edge portion or a trailing edge portion of the density, to detect the very small dotted image area on the basis of the number of edge pixels.

7 Claims, 12 Drawing Sheets

F I G. 1 B
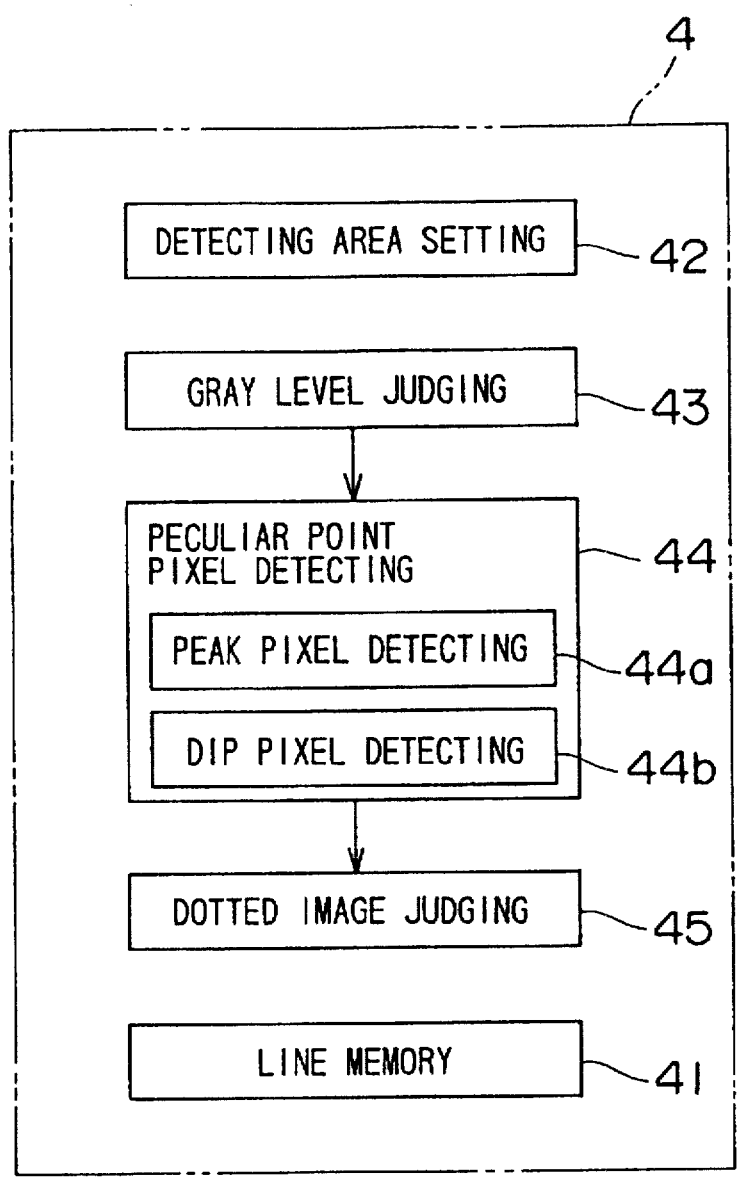

FIG. 4

| a | b | c |
|---|---|---|
| d | X | e |

FIG. 5A

| -1 | 2 | -1 |
|---|---|---|

FIG. 5B

| 1 | -2 | 1 |
|---|---|---|

F I G. 10A
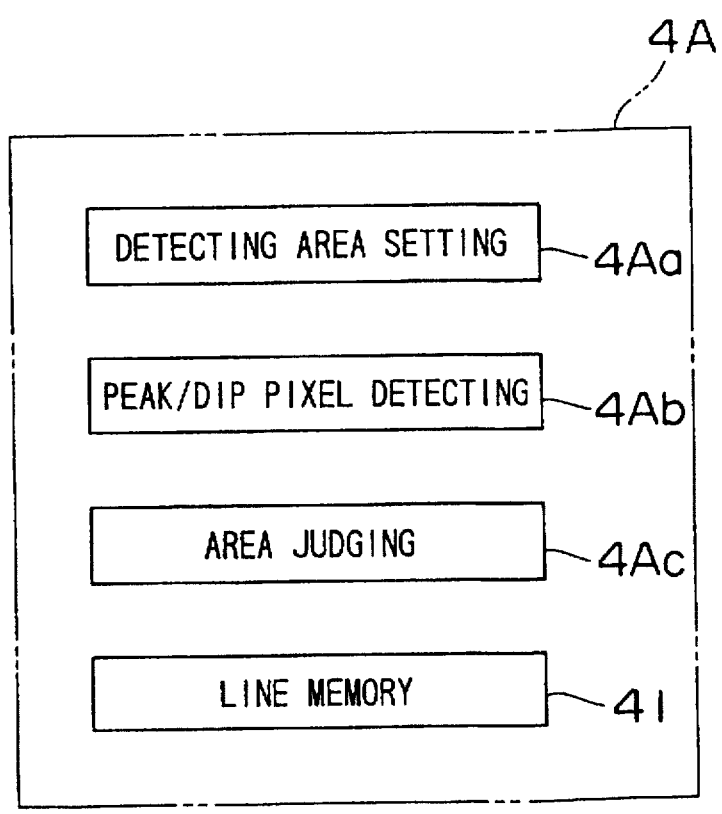

F I G. 11
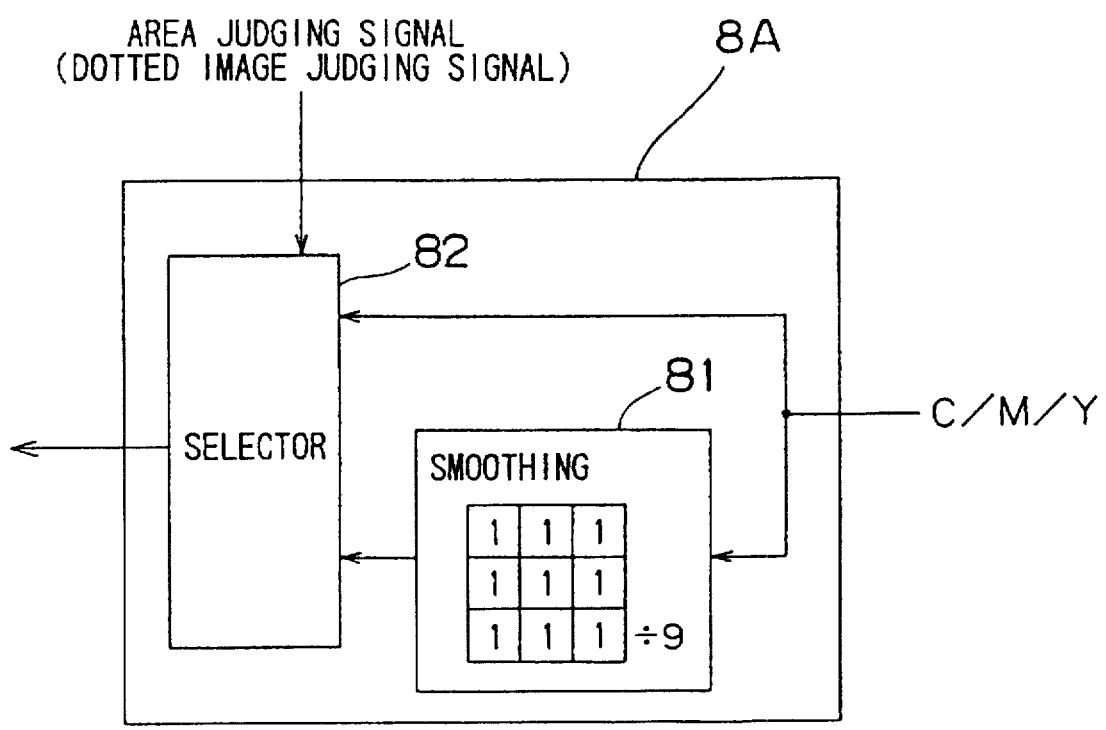

F I G. 12
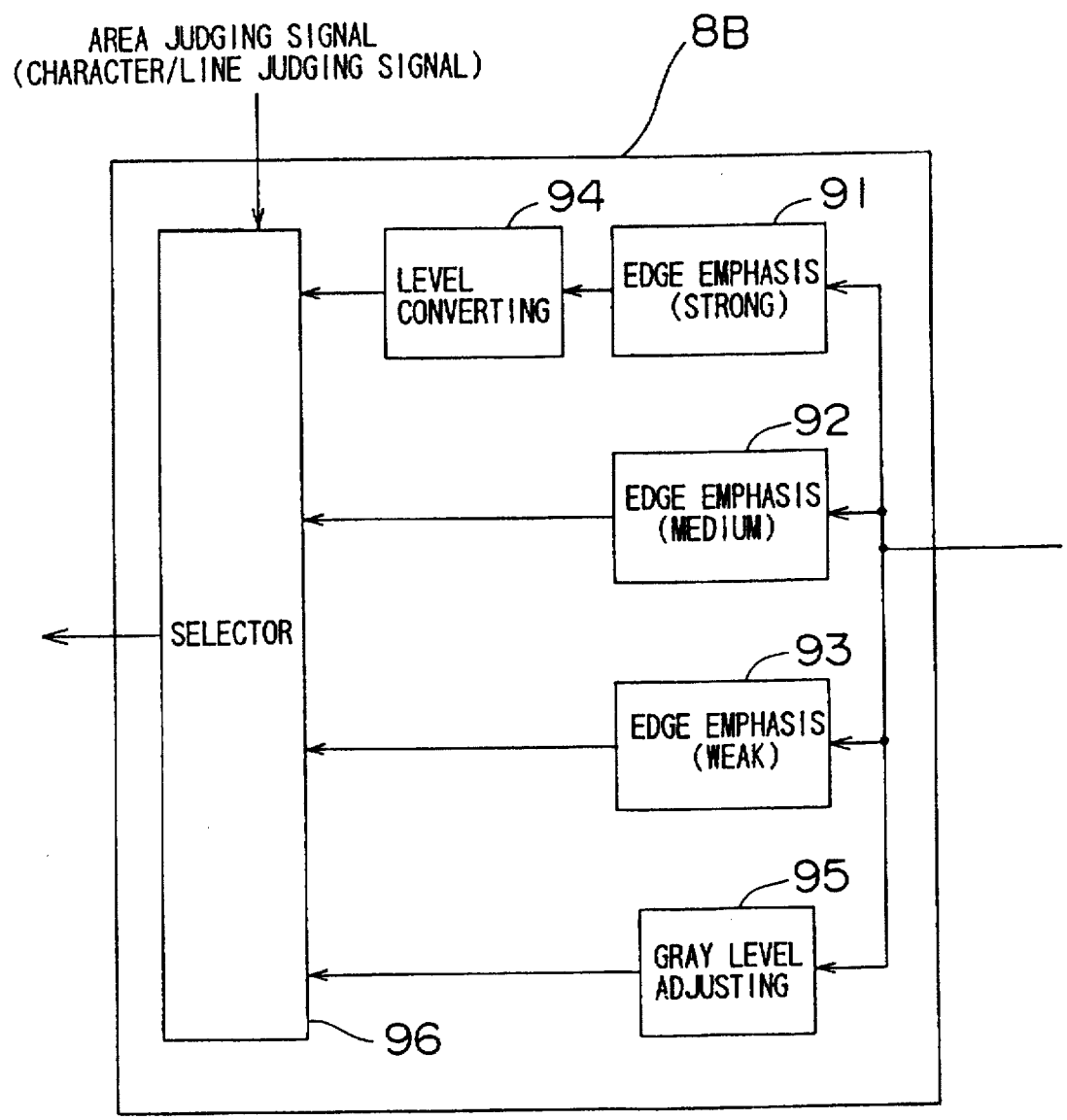

FIG. 13A

EDGE EMPHASIS(STRONG)

| -1 | 0 | -1 |
|---|---|---|
| 0 | 5 | 0 |
| -1 | 0 | -1 |

EDGE EMPHASIS(MEDIUM)

| -1 | 0 | -1 |
|---|---|---|
| 0 | 5 | 0 |
| -1 | 0 | -1 |

EDGE EMPHASIS(WEAK)

| -0.6 | 0 | -0.6 |
|---|---|---|
| 0 | 3.4 | 0 |
| -0.6 | 0 | -0.6 |

×1.0

DOTTED IMAGE AREA DETECTING APPARATUS AND DOTTED IMAGE AREA DETECTING METHOD

BACKGROUND OF THE INVENTION

1. Field of the Invention

The present invention relates to a dotted image area detecting apparatus and a dotted image area detecting method for judging whether or not each of portions of an original image is an image in a dotted image area.

Furthermore, the present invention relates to an image processor for judging whether or not each of portions of an original image is an image in a dotted image area and whether or not the portion is an image in a character or line area, to make it possible to emphasize a character or line in the dotted image area.

2. Description of the Related Art

A color digital copying machine includes a scanner which is constituted by a CCD (Charge Coupled Device) or the like. The scanner optically reads a color original for each very small pixel, and converts the color original into red (R), green (G) and blue (B) electric signals. The electric signals are converted into digital image data, and the digital image data are stored in a memory. The color digital copying machine has the function of judging to which of a character or line area, a dotted image area and a picture area belongs each of areas of the original on the basis of the image data to perform image processing corresponding to the type of area.

For example, the image in a character or line area is subjected to emphasis such as edge emphasis or emphasis of a black character. On the other hand, the image in a dotted image area is subjected to smoothing processing.

It is judged in the following manner whether or not an area to be judged is a dotted image area. The area judgment is made by successively taking, as a target pixel, pixels constituting a read image. A detecting area including a predetermined number of pixels (for example, three pixels by three pixels) which are continuous centered with respect to the target pixel is set. It is judged whether the density of the target pixel is higher or lower than the densities of the pixels around the target pixel. If the target pixel is denser than the pixels around the target pixel, the target pixel is detected as a peak pixel. On the other hand, if the target pixel is thinner than the pixels around the target pixel, the target pixel is detected as a dip pixel.

A plurality of peak pixels and dip pixels are thus detected. It is judged whether or not an area to be judged is a dotted image area by examining whether or not the spacing between peak pixels or dip pixels is suitable or whether or not the pitch of a pair of peak pixels or a pair of dip pixels is substantially fixed, for example.

Examples of the dotted image area in the original generally include a large dotted image area spreading over one surface of the original to a small dotted image area. Examples of the small dotted image area include a dotted image area having a width of only 3 mm in the horizontal scanning direction (the direction in which the original is read by the scanner).

Such a very small dotted image area may be erroneously judged to be a picture area or the like because it cannot satisfy the conventional judgment basis by using a conventional method.

Furthermore, the density of the color (the gray level) of the dotted image area includes various gray levels, that is, a high gray level, a medium gray level and a low gray level.

With respect to a high gray level dotted image area, the change in the density in the vicinity of dots constituting the dotted image area is in a gentle mountain shape, while the change in the density in an area between the dots is in a sharp valley shape. Therefore, it is difficult to reliably detect peak pixels, while it is possible to reliably detect dip pixels. With respect to a low gray level dotted image area, the change in the density in the vicinity of dots is in a sharp mountain shape, while the change in the density in an area between the dots is in a gentle valley shape. Therefore, it is possible to reliably detect peak pixels, while it is difficult to reliably detect dip pixels. With respect to a medium gray level dotted image area, it is possible to satisfactorily detect both peak pixels and dip pixels.

Such properties of the dotted image area have not been conventionally considered. That is, the judgment of the dotted image area has been conventionally made on the basis of either the peak pixels or the dip pixels without depending on the gray level of the dotted image area. Therefore, the dotted image area cannot, in some cases, be detected.

Furthermore, a character or line area may, in some cases, exist in the dotted image area. The character or line area may, in some cases, be judged to be a dotted image area if it is narrow. Therefore, an image in the character or line area may be subjected to smoothing which is image processing corresponding to the dotted image area. As a result, the sharpness and the blackness of the character or line are lost.

SUMMARY OF THE INVENTION

A first object of the present invention is to provide a dotted image area detecting apparatus capable of reliably detecting a very small dotted image area.

A second object of the present invention is to provide a dotted image area detecting method in which a very small dotted image area can be reliably detected.

A third object of the present invention is to provide a dotted image area detecting apparatus capable of reliably detecting peak/dip pixels irrespective of whether the gray level of the dotted image area is higher or lower and consequently, capable of accurately detecting the dotted image area.

A fourth object of the present invention is to provide a dotted image area judging method in which peak/dip pixels can be reliably detected irrespective of whether the gray level of the dotted image area is higher or lower and consequently, the dotted image area can be accurately detected.

A fifth object of the present invention is to provide an image processor capable of judging, even with respect to an area which is judged to be a dotted image area, a character or line area in the dotted image area and emphasizing a character or line.

A sixth object of the present invention is to provide an image processing method in which it is possible to judge, even with respect to an area which is judged to be a dotted image area, a character or line area in the dotted image area and emphasize a character or line.

According to the present invention, a detecting area including a predetermined number of pixels including a target pixel is set. An edge pixel positioned at a density change point in an image is detected on the basis of image data. Further, it is judged whether or not the detecting area belongs to a dotted image area on the basis of the number of edge pixels in the detecting area.

Consequently, it is possible to detect edges peculiar to a dotted image area on the basis of a leading edge portion or a trailing edge portion of the density to detect a very small dotted image area on the basis of the number of edge pixels.

It is preferable that the edge pixels are detected by finding the relationship between the density of the target pixel and the densities of pixels around the target pixel using a matrix with two pixels by two pixels including the target pixel. Consequently, an area to be judged can be significantly decreased to detect a leading or trailing edge, whereby the capacity of an image memory may be small, thereby making it possible to simplify a processing circuit.

The matrix with two pixels by two pixels may have the target pixel at the lower right. In this case, if the density X of the target pixel, the density A of the pixel at the upper left of the matrix, the density B of the pixel at the upper right of the matrix, and the density C of the pixel at the lower left of the matrix satisfy the conditions indicated by the following expressions (1), (2) and (3), the target pixel can be detected as a leading edge pixel. Consequently, it is possible to detect a leading edge pixel peculiar to the dotted image area.

| | |
|---|---|
| $(X - C) > TH$ | (1) |
| $(X - B) > TH$ | (2) |
| $(B - A) \leq TH$ | (3) | where TH is a predetermined threshold value.

Furthermore, if all the conditions indicated by the following expressions (4), (5) and (6) are satisfied, it is possible to detect the target pixel as a trailing edge pixel. Consequently, it is possible to detect a trailing edge pixel peculiar to the dotted image area.

| | |
|---|---|
| $(C - X) > TH$ | (4) |
| $(B - X) > TH$ | (5) |
| $(A - B) \leq TH$ | (6) |

Furthermore, the edge pixels may be detected by finding the relationship between the density of the target pixel and the densities of the pixels around the target pixel using a filter of three pixels by one line. Consequently, the edge pixels can be detected using a small judging area, whereby the capacity of an image memory may be small, thereby making it possible to simplify a processing circuit.

Additionally, if the density a of the left pixel on the upper line in a matrix with three pixels by two lines having the target pixel at the center of the lower line, the density b of the middle pixel on the upper line, the density c of the right pixel on the upper line, the density d of the left pixel on the lower line, the density e of the right pixel on the lower line, and the density X of the target pixel satisfy the conditions indicated by the following expression (8), it is preferable that the target pixel is detected as a leading edge pixel. Consequently, it is possible to detect a leading edge pixel peculiar to the dotted image area.

$$2X-d-e>th \text{ and } 2b-a-c \leq th \quad (8)$$

where th is a predetermined threshold value.

Similarly, if the conditions indicated by the following expression (9) are satisfied, the target pixel can be detected as a trailing edge pixel. Consequently, it is possible to detect a trailing edge pixel peculiar to the dotted image area:

$$d+e-2X>th \text{ and } a+c-2b \leq th \quad (9)$$

It is preferable that both a leading edge pixel positioned in a leading edge portion of the density in the image and a trailing edge pixel positioned in a trailing edge portion of the density in the image are detected as edge pixels Furthermore, if the number of edge pixels in the detecting area is not less than a predetermined threshold value, it is preferable that the detecting area is judged to belong to a dotted image area.

According to the present invention, a detecting area including a predetermined number of pixels is set. The gray level of an image in the vicinity of the detecting area is judged to be any one of a high gray level, a medium gray level and a low gray level on the basis of image data. If the gray level in the vicinity of the detecting area is judged to be the low gray level, a peak pixel in the detecting area is detected as a peculiar point pixel. On the other hand, if the gray level in the vicinity of the detecting area is judged to be the high gray level, a dip pixel in the detecting area is detected as a peculiar point pixel. Further, if the gray level in the vicinity of the detecting area is judged to be the medium gray level, the peak pixel and the dip pixel in the detecting area are detected as peculiar point pixels. It is judged whether or not the detecting area belongs to a dotted image area on the basis of the peculiar point pixel density in the detecting area.

Dots constituting the low gray level dotted image area are small. Therefore, the change in the density in the vicinity of the dots is in a sharp mountain shape, while the change in the density in an area between the dots is in a gentle valley shape. Therefore, peak pixels are detected as a peculiar point pixel with respect to the low gray level dotted image area.

On the other hand, dots constituting the high gray level dotted image area are relatively large. Therefore, the change in the density in the vicinity of the dots is in a wide and gentle mountain shape, while the change in the density in the area between the dots is in a narrow and deep valley shape. Therefore, dip pixels are detected as a peculiar point pixel with respect to the high gray level dotted image area.

Furthermore, both a peak and a dip have the same degree of sharpness in the medium gray level dotted image area. Both the peak pixel and the dip pixel can be detected as peculiar point pixels.

In the present invention, the dotted image area is thus judged on the basis of either one or both of the peak pixel density and the dip pixel density depending on the gray level of the image area. Consequently, it is possible to reliably detect the peak/dip pixels irrespective of whether the gray level of the dotted image area is higher or lower and consequently, to accurately detect the dotted image area.

It is preferable that the gray level of the detecting area is judged by finding the average value of the image data corresponding to the pixels in the detecting area and comparing the average value with a predetermined threshold value.

Furthermore, according to the present invention, a detecting area including a predetermined number of pixels is set. It is judged whether or not the detecting area belongs to a dotted image area and whether or not the detecting area belongs to a character or line area on the basis of image data corresponding to the pixels in the set detecting area. Image data corresponding to a pixel in the area which has been judged to belong to a dotted image area is subjected to smoothing processing. Image data corresponding to a pixel in the area which has been judged to belong not only to a dotted image area but also to a character or line area is subjected to edge emphasizing processing by character or line emphasizing means in addition to the smoothing processing.

Consequently, the possibility that a character or line in a dotted image area is blurred due to the smoothing processing is eliminated. Therefore, a character or line portion is emphasized to some extent even in a dotted image area, thereby making it possible to output a clear character or line image.

It is preferable that image data corresponding to a pixel in the area which has been judged to belong not to a character or line area but to a dotted image area is subjected to edge emphasizing processing weaker than the edge emphasizing processing by the character or line emphasizing means. Consequently, it is possible to return the gray level attenuated by the smoothing processing to some extent. As a result, it is possible to obtain an image having no moiré.

Furthermore, it is preferable that image data corresponding to a pixel constituting a character or line in the area which has been judged to belong not to a dotted image area but to a character or line area is subjected to edge emphasizing processing stronger than the edge emphasizing processing by the character or line emphasizing means. Consequently, the character or line is sharply represented.

Additionally, it is preferable that the image data corresponding to the pixel which has been subjected to the strong edge emphasizing processing and which has been judged to constitute a black character image is further subjected to level converting processing for emphasizing a black color. Consequently, it is possible to reproduce the character or line in deep black.

Furthermore, it is preferable that image data corresponding to a pixel around a character or line in the area which has been judged to belong not to a dotted image area but to a character or line area is subjected to gray level adjusting processing for restraining the density of the pixel. Consequently, it is possible to erase a blur sticking out a character or line.

Additionally, it is preferable that image data corresponding to a pixel in the area which has been judged to belong to neither a dotted image area nor a character or line area is subjected to edge emphasizing processing weaker than the edge emphasizing processing by the character or line emphasizing means. Consequently, it is possible to perform good processing for a picture area. Specifically, the change in the gray level can be emphasized while preserving the medium gray level, thereby making it possible to obtain an image having a depth effect.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1B is a block diagram showing the functional features of a character/dotted/picture area judging circuit according to the second embodiment;

FIG. 4 is a diagram showing a 2×3 matrix area set for judging a leading edge pixel or a trailing edge pixel;

FIG. 5A is a diagram showing the content of a leading edge detecting filter which is applied to the 2×3 matrix area;

FIG. 5B is a diagram showing the content of a trailing edge detecting filter which is applied to the 2×3 matrix area;

FIG. 10A is a block diagram showing the functional features of a character/dotted/picture area judging circuit according to the third embodiment;

FIG. 11 is a block diagram showing the construction of a principal part of a dotted image filter circuit;

FIG. 12 is a block diagram showing the construction of a principal part of a character/line area filter circuit; and FIGS. 13A, 13B and 13C are diagrams showing examples of a filter for edge emphasis.

DESCRIPTION OF THE PREFERRED EMBODIMENTS

1. First Embodiment

Figure 1:
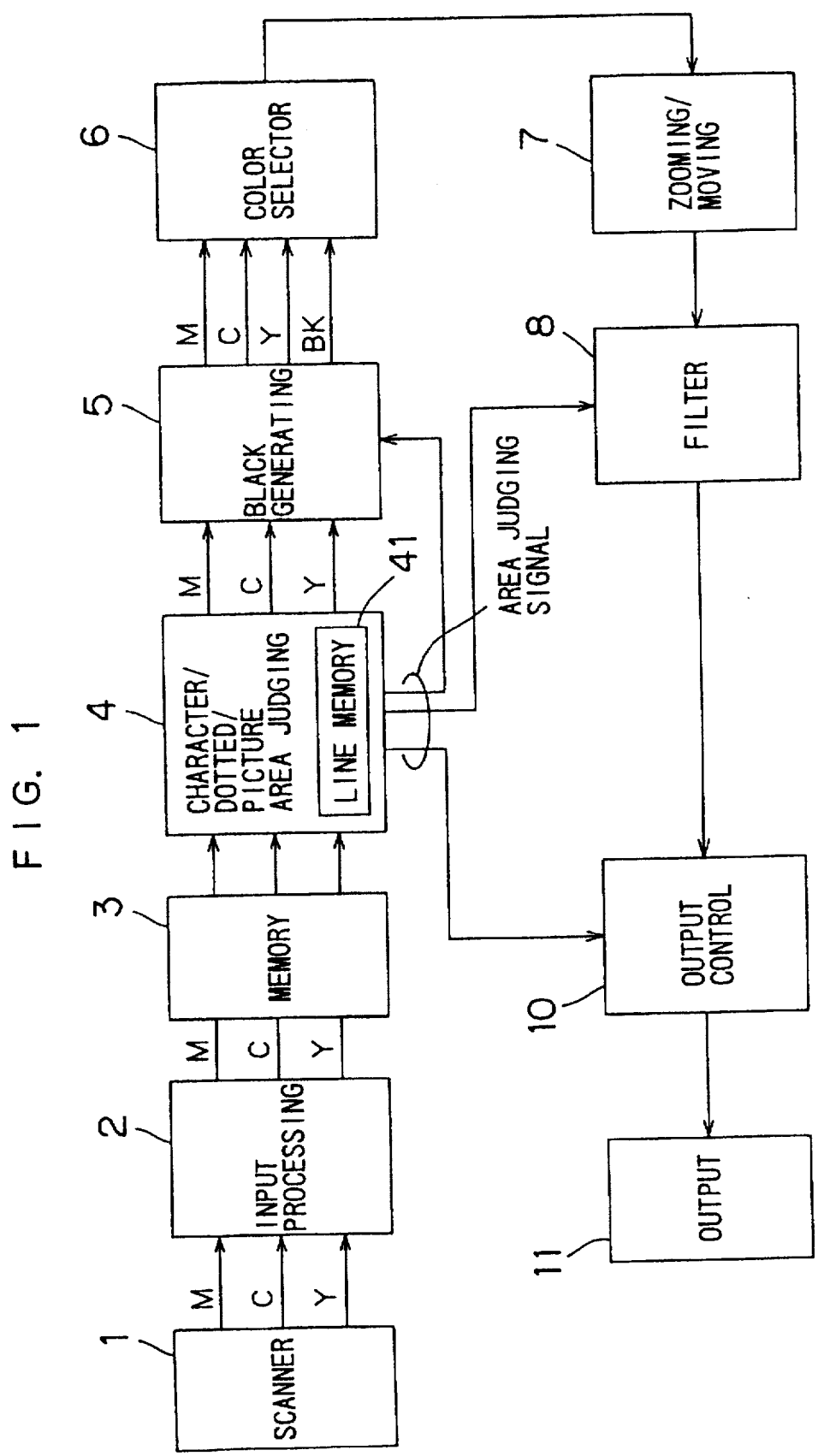
FIG. 1 is a block diagram showing the electrical construction of a principal part of a color digital copying machine to which a first embodiment and a second embodiment of the present invention are applied.

FIG. 1 is a block diagram showing the electrical construction of a principal part of a color digital copying machine.

The color digital copying machine comprises a scanner 1 which is constituted by a CCD (Charge Coupled Device) for example. The scanner 1 scans a color original in one direction (hereinafter referred to as the horizontal scanning direction), reads the color original for each very small pixel, and converts the color original into signals representing the three primary colors, yellow (Y), magenta (M) and cyan (C). The resolution of the scanner 1 may be approximately 400 pixels per inch.

The Y, M and C three-primary-color signals are converted into digital image data, after which the digital image data are subjected to correction processing corresponding to the characteristics of toner, for example, by an input processing circuit 2. Image data after the processing are temporarily stored in an FIFO (First-In First-Out) memory 3. The image data corresponding to a predetermined number of lines (for example, three lines) selected for judging the type of area out of the stored image data are transferred to a character/dotted/picture area judging circuit 4, and are stored in a line memory 41 inside thereof. The character/dotted/picture area judging circuit 4 judges which of a character or line area, a dotted image area and a picture area is an area to be processed.

On the other hand, the Y, M and C three-primary-color image data are supplied to a black generating circuit 5, where black (BK) data for compensating for density insufficiency in a high density original are produced.

Further, the image data in four colors Y, M, C and BK are taken out for each color by a color selector circuit 6, and the image data taken out are supplied to a zooming/moving circuit 7, where the image data are converted into data corresponding to the set magnification or the like. In a filter circuit 8, the image data are subjected to smoothing and edge sharpening depending on the type of judged area.

The image data are finally outputted to an output section 11 such as a laser printer section through an output control circuit 10.

Figure 1A:
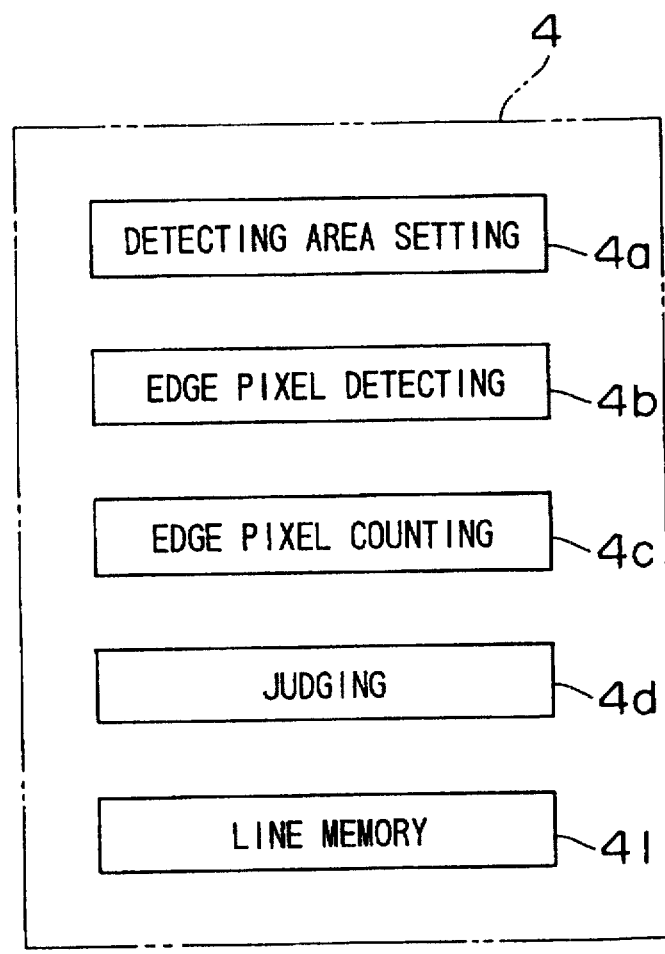
FIG. 1A is a block diagram showing the functional features of a character/dotted/picture area judging circuit according to the first embodiment.

Description is now made of the details of the function of judging a dotted image area in the character/dotted/picture area judging circuit 4. As shown in FIG. 1A, the character/dotted/picture area judging circuit 4 includes a detecting area setting means 4a, an edge pixel detecting means 4b, an edge pixel counting means 4c, a judging means 4d, and the line memory 41. The detecting area setting means 4a sets a detecting area including a predetermined number of pixels including a target pixel. The edge pixel detecting means 4b detects edge pixels positioned at a density change point. The edge pixel counting means 4c counts the detected edge pixels. The judging means 4d judges whether or not the detecting area belongs to a dotted image area.

(1) Detection of leading or trailing edge pixel

Figures 2, 3:
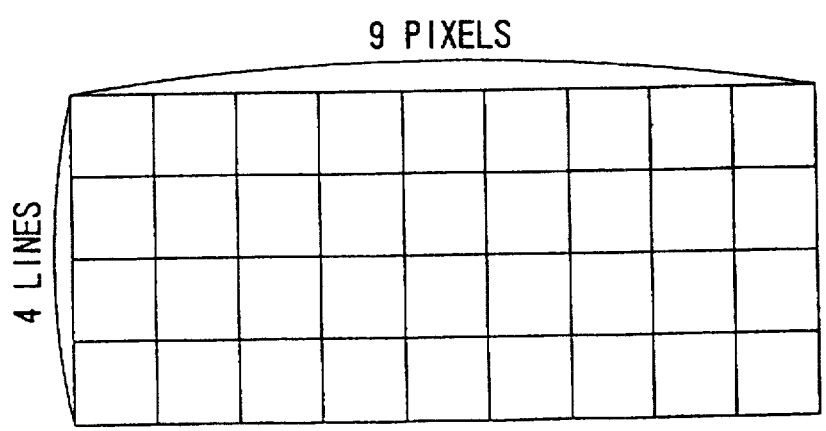
FIG. 2 is a diagram showing a 2×2 matrix area set for judging a leading edge pixel or a trailing edge pixel.
FIG. 3 is a diagram showing a 4×9 matrix area for determining whether or not a target area is a dotted image area.

The character/dotted/picture area judging circuit 4 successively processes respective pixels corresponding to image data stored in the line memory 41 as a target pixel. Specifically, a matrix with two pixels by two lines having a target pixel X at the lower right is used, as shown in FIG. 2. The following density judgment is made using image data corresponding to the pixels constituting the matrix. Density values of an upper left pixel A, an upper right pixel B, a lower left pixel C and the target pixel X shall be represented by reference symbols of the respective pixels. At this time, if all the conditions indicated by the following expressions (1), (2) and (3) are satisfied, the target pixel X is detected as an edge pixel:

| | | |
|---|---|---|
| (X − C) > TH | | (1) |
| (X − B) > TH | | (2) |
| (B − A) ≦ TH | | (3) | where TH is a predetermined threshold value.

The foregoing expression (1) indicates that the density of the target pixel X is considerably higher than the density of the pixel C adjacent thereto on the left side. The foregoing expression (2) indicates that the density of the target pixel X is considerably higher than the pixel B adjacent thereto on the upper side. The foregoing expression (3) indicates that the density of the pixel B adjacent to the target pixel X on the upper side is not considerably higher than the density of the pixel A adjacent thereto on the left side.

It is preferable that the threshold value TH is set to five, for example, when the density of the pixel is represented at 256 gray levels, for example. When a uniform gray level portion in a picture area of an original is read in, the change in the gray level hardly becomes not less than five. On the contrary, when a uniform gray level portion in a dotted image area of the original is read in, a step of a gray level change of not less than five naturally occurs. Consequently, a pixel in a leading edge portion of the density in a picture area can be prevented from being detected as a leading edge pixel in a dotted image area by setting the threshold value as described above.

On the other hand, if all the conditions indicated by the following expressions (4), (5) and (6) are satisfied, the target pixel X is detected as a trailing edge pixel:

| | | |
|---|---|---|
| (C − X) > TH | | (4) |
| (B − X) > TH | | (5) |
| (A − B) ≦ TH | | (6) |

The foregoing expression (4) indicates that the density of the target pixel X is considerably lower than the density of the pixel C adjacent thereto on the left side. The foregoing expression (5) indicates that the density of the target pixel X is considerably lower than the density of the pixel B adjacent thereto on the upper side. The foregoing expression (6) indicates that the density of the pixel B adjacent to the target pixel X on the upper side is not considerably lower than the density of the pixel A adjacent thereto on the left side.

If the target pixel X is detected as a leading edge pixel or a trailing edge pixel by the above described judgment, the target pixel X is taken as a dot candidate. Such processing is performed for each pixel on each line corresponding to the image data temporarily stored in the line memory 41.

Leading edge pixels satisfying the foregoing conditions (1), (2) and (3) or trailing edge pixels satisfying the foregoing conditions (4), (5) and (6) are edge pixels peculiar to a dotted image area. That is, edge pixels constituting a character image cannot satisfy the foregoing conditions. Therefore, only edge pixels constituting a dotted image area can be reliably detected.

(2) Dotted image area judgment

For example, an area including 36 pixels in a matrix with nine pixels by four lines as shown in FIG. 3 is paid attention to, and is taken as one block. Leading edge pixels and trailing edge pixels found by the above described method in the block are counted. It is judged whether or not the block belongs to a dotted image area in accordance with the judging conditions indicated by the following expression (7) on the basis of the result of the counting:

(the number of leading edge pixels)+(the number of trailing edge pixels)≧$TH_{UD}$ (7)

where $TH_{UD}$ is a predetermined threshold value.

If the conditions indicated by the foregoing expression (7) are satisfied, it is judged that the block belongs to a dotted image area.

It is preferable that the threshold value $TH_{UD}$ is set to four, for example. A numeral "4" is a value determined in consideration of the number of dots existing in the above described area including 36 pixels in a dotted image original in which the number of rows of dots arranged per inch (hereinafter referred to as "ruling") is from 100 to 200.

Such processing is performed for each block corresponding to the image data temporarily stored in the line memory 41.

Edges peculiar to a dotted image area are detected by thus detecting pixels constituting leading and trailing edges. It is possible to detect a very small dotted image area having a width in the horizontal scanning direction of not more than 3 millimeters on the basis of the number of edge pixels within a detecting area including a predetermined number of pixels.

The following modification is possible with respect to the present embodiment. Specifically, although in the above described embodiment, the block including 4×9=36 pixels (see FIG. 3) is assumed as a unit area for judging whether or not the detecting area belongs to a dotted image area, the size of the block is not limited to the same. A block including an arbitrary number of pixels may be set.

Figures 4, 5A, 5B:
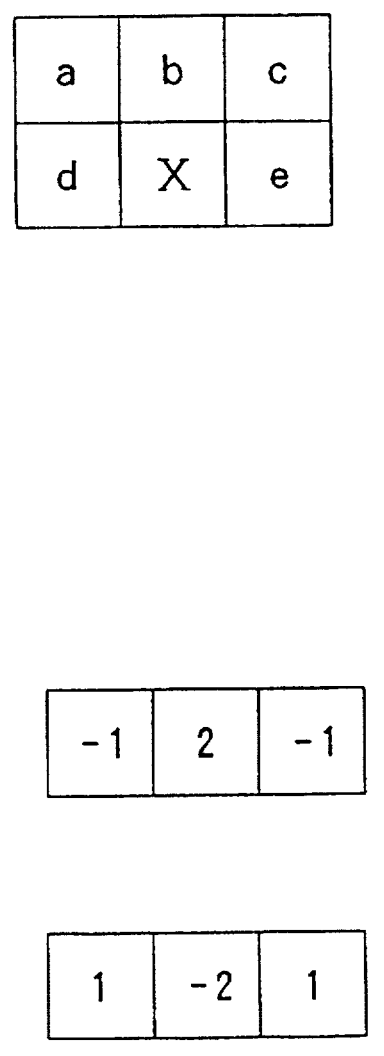

Furthermore, in the above described embodiment, the density of the target pixel X and the densities of the pixels A to C around the target pixel X are compared with each other using the matrix with two pixels by two lines (see FIG. 2) in order to detect leading edge pixels and trailing edge pixels. However, a method using an edge detecting filter is also applicable to detection of edge pixels. Specifically, a matrix with three pixels by two lines as shown in FIG. 4 may be used, to process image data representing pixels on the upper line and the lower line using a filter as shown in FIG. 5. The following judgment may be made with respect to the target pixel X positioned in the center of the lower line. Specifically, if the following conditions are satisfied, the target pixel X is taken as a leading edge pixel.

$$2X-d-e>th \text{ and } 2b-a-c \leq th \tag{8}$$

Specifically, if the density of the target pixel X is considerably higher than the densities of the pixels d and e adjacent thereto on the left and right sides, and if the density of the pixel b adjacent to the target pixel X on the upper side is not considerably higher than the densities of the pixels a and c adjacent thereto on the left and right sides, it is judged that the target pixel X is a leading edge pixel.

In this case, th is a threshold value. The threshold value th may be set to a value which is twice the above described threshold value TH for detecting edge pixels. The reason for this is that data corresponding to the target pixel X is multiplexed by a coefficient "2". If the following conditions are satisfied, the target pixel X is taken as a trailing edge pixel:

$$d+e-2X>th \text{ and } a+c-2b \leq th \tag{9}$$

Specifically, if the density of the target pixel X is considerably lower than the densities of the pixels d and e adjacent thereto on the left and right sides, and if the density of the pixel b adjacent to the target pixel X on the upper side is not considerably lower than the densities of the pixels a and c on the left and right sides, it is judged that the target pixel X is a trailing edge pixel.

It is also possible to accurately detect leading edge pixels or trailing edge pixels peculiar to the dotted image area by this method.

2. Second Embodiment

Description is now made of a second embodiment of the present invention. In the description of the present embodiment, FIG. 1 will be referred to again. Furthermore, the present embodiment is characterized by the judgment of a dotted image area. Therefore, description is now made of the details of the function of judging a dotted image area in a character/dotted/picture area judging circuit 4.

FIG. 1B shows a functional features of the area judging circuit 4. The circuit 4 includes a detecting area setting means 42 for setting a detecting area including a predetermined number of pixels, a gray level judging means 43, a peculiar point pixel detecting means 44, a dotted image judging means 45 for judging whether or not the detecting area belongs to a dotted image area on the basis of a peculiar point pixel density in the detecting area, and the line memory 41. The gray level judging means 43 judges the gray level, high, low or medium, of the vicinity of the detecting area. The peculiar point pixel detecting means 44 includes a peak pixel detecting means 44a and a dip pixel detecting means 44b. Based on the judgment of the gray level judging means 43, either or both of the detecting means 44a and 44b perform the detection.

Figures 6, 7:
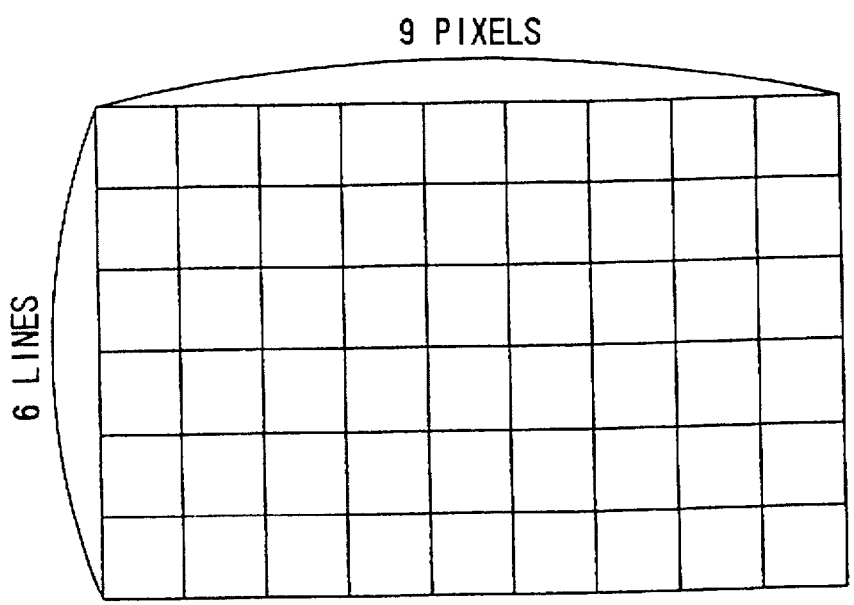
FIG. 6 is a diagram showing a 9×6 matrix area set for judging the gray level of the density of an image area.
FIG. 7 is a diagram showing a 3×3 matrix area for judging whether or not a target pixel is a peak pixel/dip pixel.

The character/dotted/picture area judging circuit 4 first finds the average value of the density of a target pixel and the densities of pixels around the target pixel, and compares the average value with a set threshold value. For example, a matrix with nine pixels by six lines (the matrix is taken as one block) as shown in FIG. 6 is used, to find the average value AVE of the densities of all 54 the pixels.

It is judged that the block is at a high gray level if $AVE>TH_h$ ($TH_h$ is a threshold value for detecting a high gray level), the block is at a low gray level if $AVE<TH_l$ ($TH_l$ is a threshold value for detecting a low gray level), and the block is at a medium gray level if $TH_l<AVE<TH_h$.

In this case, each of the threshold values $TH_l$ and $TH_h$ may be set to a value at which the gray level is best divided. For example, if the density of an image can be represented at 256 gray levels from 0 to 255 by image data, the threshold values $TH_l$ and $TH_h$ may be set so as to divide an entire gray level section into three sections. In addition, the threshold values $TH_l$ and $TH_h$ may be set by taking the nonlinearity of the input characteristics of a scanner 1 into consideration.

Image data temporarily stored in a line memory 41 in the character/dotted/picture area judging circuit 4 are processed using image data representing pixels in a matrix with three pixels by three lines (see FIG. 7) in order to detect peak pixels and dip pixels.

If a value obtained by subtracting from the density of a target pixel X in the center the maximum value of the densities of pixels A to H around the target pixel X is more than a predetermined threshold value, it is judged that the target pixel X is a peak pixel. On the other hand, if a value obtained by subtracting the density of the target pixel X from the minimum value of the densities of the pixels A to H around the target pixel X is more than a predetermined value, it is judged that the target pixel X is a dip pixel.

It is preferable that the threshold value is set to "5" when the density of each of the pixels is represented at 256 gray levels, for example. Where a uniform gray level portion in a picture area of an original is read in, the change in the gray level hardly becomes not less than five. On the contrary, where a uniform gray level portion in a dotted image area of an original is read in, a step of a gray level change of not less than five naturally occurs. Consequently, pixels in the picture area can be prevented from being detected as peak pixels or dip pixels by setting the threshold value as described above.

For example, where image data corresponding to three lines are stored in the line memory 41, the above described processing is performed for each pixel on a middle line out of three lines whose image data are temporarily stored in the line memory 41.

On the other hand, it must be determined which of the peak pixels and the dip pixels which are detected in the above described manner are employed for judging a dotted image area. This determination is made depending on the above described results of judgment which of a high gray level, a low gray level and a medium gray level is the gray level.

Figure 8:
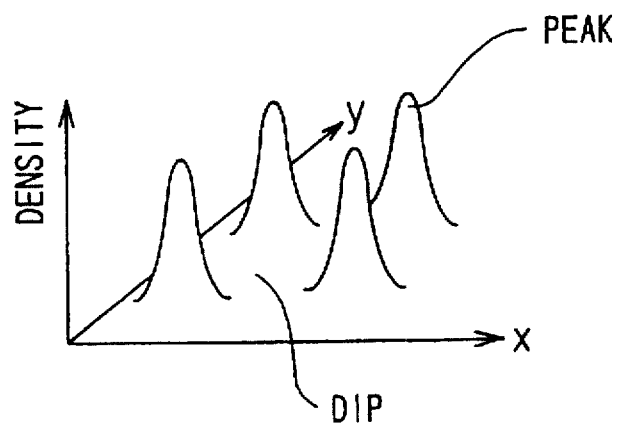
FIG. 8 is a diagram showing the density distribution in a low gray level dotted image area.

Specifically, with respect to pixels in a low gray level block, a dotted image area is constituted by small dots. Therefore, the change in the density in the vicinity of the dots is in a sharp mountain shape, while the change in the density between the dots is in a gentle valley shape, as shown in FIG. 8. Consequently, it is impossible to detect the accurate positions of dip pixels. Therefore, peak pixels are exclusively paid attention to. If the number of peak pixels in the block is more than a predetermined number, the block is judged to belong to a dotted image area.

Figure 9:
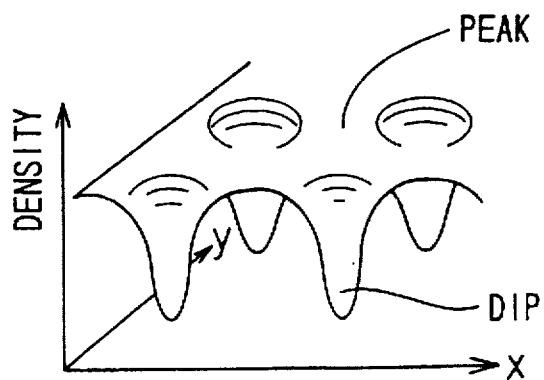
FIG. 9 is a diagram showing the density distribution in a high gray level dotted image area.

With respect to pixels in a high gray level block, a dotted image area is constituted by large dots. Therefore, the change in the density between the dots is in a deep valley shape, while the change in the density in the vicinity of the dots is in a gentle mountain shape, as shown in FIG. 9. Consequently, it is impossible to detect the accurate positions of the peak pixels. Therefore, the dip pixels are exclusively paid attention to. If the number of dip pixels in the block is more than a predetermined number, therefore, the block is judged to belong to a dotted image area.

In a medium gray level block, both a peak and a dip of the change in the density have the same degree of sharpness, whereby it cannot be decided which of peak pixels and dip pixels are suited to judge a dotted image area. Therefore, both peak pixels and dip pixels are paid attention to. If the number of peak pixels in the block is more than the predetermined number or the number of dip pixels in the block is more than the predetermined value, the block is judged to belong to a dotted image area.

When the foregoing processing is completed with respect to the middle line out of the three lines whose image data are temporarily stored in the line memory 41, the same processing is also performed with respect to the succeeding line.

As described in the foregoing, according to the present embodiment, it is judged whether or not an area in the block belongs to a dotted image area using either one or both of peak pixels and dip pixels depending on the average gray level of the area. Consequently, it is possible to judge a dotted image area more reliably.

The present embodiment can be modified in the following manner. Specifically, although in the above described embodiment, the block including 6×9=54 pixels (see FIG. 6) is set as an area for judging the gray level of an image, the size of the block is not limited to the same. For example, a block of arbitrary size may be set.

Furthermore, in the above described embodiment, the matrix with three pixels by three lines (see FIG. 7) is used for detecting peak pixels and dip pixels, and the density of the target pixel X and the densities of the pixels A to H around the target pixel X are compared with each other. However, the peak pixels and the dip pixels can be also detected by examining the relationship between the density of the target pixel and the density of the adjacent pixel on the basis of pixel information on only one line, for example.

3. Third Embodiment

Figure 10:
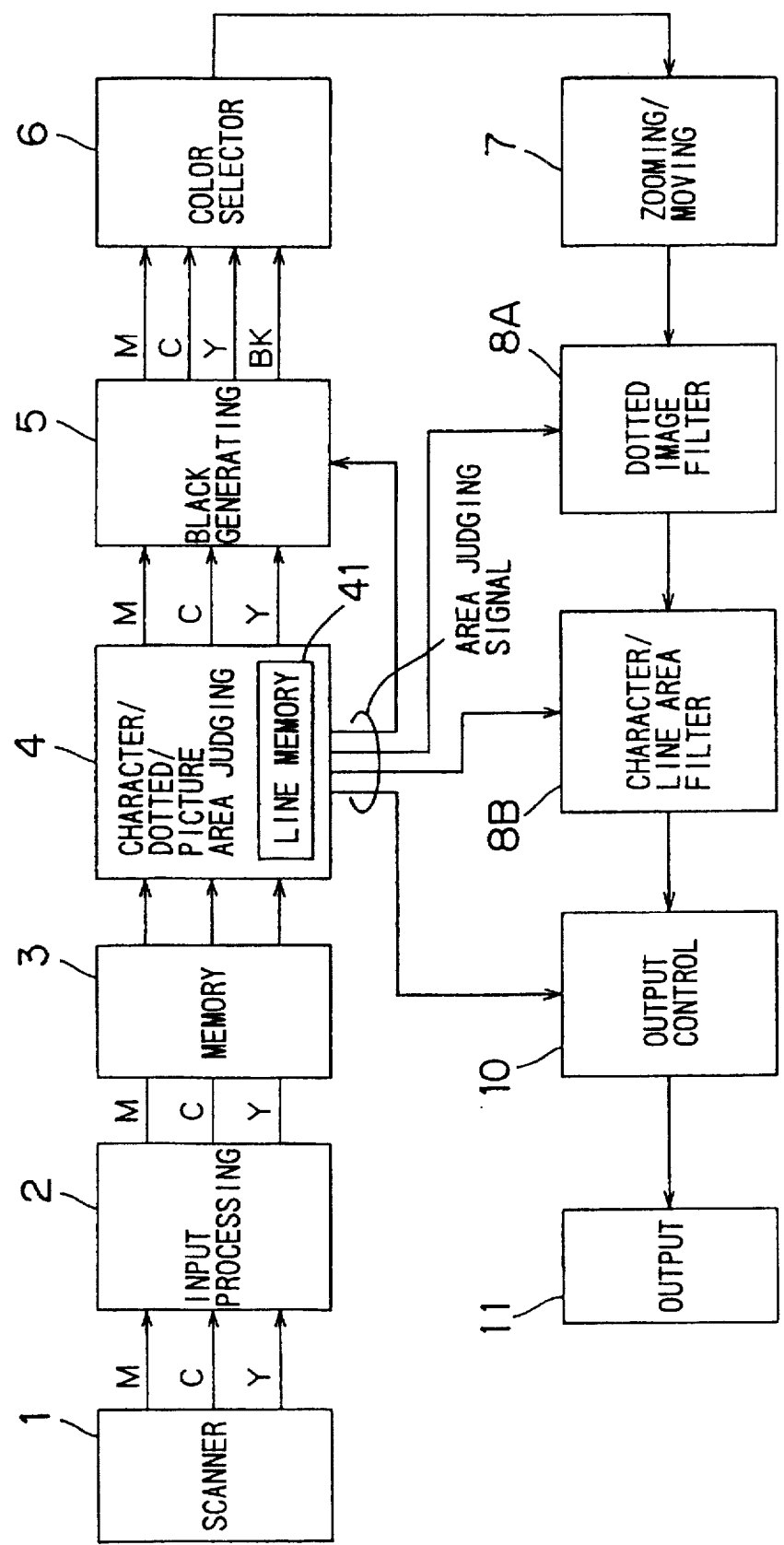
FIG. 10 is a block diagram showing the electrical construction of a principal part of a color digital copying machine to which a third embodiment of the present invention is applied.

FIG. 10 is a block diagram showing the electrical construction of a digital copying machine to which a third embodiment of the present invention is applied. In FIG. 10, sections having the same functions as those of the respective sections shown in FIG. 1 are assigned the same reference numerals. In the digital copying machine shown in FIG. 10, a dotted image filter circuit 8A performs smoothing processing on the basis of the result of area judgment by a character/dotted/picture area judging circuit 4A. In a character/line area filter circuit 8B in the succeeding stage, edge sharpening processing and gray level adjusting processing are performed on the basis of the result of the judgment by the character/dotted/picture area judging circuit 4A.

As shown in FIG. 10A, the character/dotted/picture area judging circuit 4 includes a detecting area setting means 4A$a$ for setting a detecting area including a predetermined number of pixels, a peak/dip pixel detecting means 4A$b$ for detecting peak pixels and dip pixels, an area judging means 4A$c$ for judging whether or not the detecting area belongs to a dotted image area and whether or not the detecting area belongs to a character or line area, and the line memory 41.

(1) Area Judgment

Description is first made of the function of judging an area by the character/dotted/picture area judging circuit 4A.

Information corresponding to three lines which are temporarily stored in a line memory 41 in the character/dotted/picture area judging circuit 4A are processed using image data corresponding to pixels in a matrix with three pixels by three lines (see FIG. 7), whereby peak pixels and dip pixels are detected.

The following judgment basis is used for detecting peak pixels and dip pixels. Specifically, in the three by three matrix shown in FIG. 7, if the density of a target pixel X is higher than the densities of pixels B, C, D and H around the target pixel X, and if a value obtained by subtracting a predetermined value ("5", for example) from the density of the target pixel X is higher than the densities of pixels A, E, F and G around the target pixel, the target pixel X is judged to be a peak pixel. On the other hand, if the density of the target pixel X is lower than the densities of the pixels B, C, D and H around the target pixel X, and a value obtained by adding the predetermined value to the density of the target pixel X is lower than the densities of the pixels A, E, F and G around the target pixel X, the target pixel X is Judged to be a dip pixel.

Where the image data corresponding to three lines are stored in the line memory 41, the above described processing is performed for each pixel on the middle line.

After the foregoing processing is completed with respect to the middle line out of the three lines whose image data are temporary stored in the line memory 41, the same processing is also performed with respect to the succeeding line.

It can be thus determined whether or not each of pixels is a peak/dip pixel with respect to each of the three-primary colors Y, M and C constituting original image data.

It is then independently Judged whether or not the area of an original belongs to a dotted image area and whether or not the area belongs to a character or line area.

The judgments are made in the following manner, for example, which have been conventionally known.

If predetermined periodicity is satisfied with respect to original image data in a certain area when one-dimensional or two-dimensional periodicity of occurrence of peak pixels, for example, is paid attention to, the area is a dotted image area (see Japanese Patent Laid-Open No. 109656/1988).

Abrupt leading and trailing edge portions of the density are detected, to judge whether or not the area of the original is a character or line area on the basis of the ratio of the number of pixels constituting edges in a predetermined area to the number of pixels having the same binary-coded value ("0" or "1") (see Japanese Patent Laid-Open No. 222074/1990 and Japanese Patent Laid-Open No. 110677/1990).

The judgment whether or not an area to be judged belongs to a dotted image area and the judgment whether or not an area to be judged belongs to a character or line area are independent. Therefore, four types of results of judgment, that is, (a) it is a dotted image area and a character or line area (a character or line image in a dotted image area), (b) it is not a character or line area but a dotted image area, (c) it is not a dotted image area but a character or line area, and (d) it is neither a dotted image area nor a character or line area (a picture image).

(2) Dotted Image Filter

FIG. 11 is an internal block diagram showing the construction of a principal part of the dotted image filter circuit 8A. Data representing any one of the three primary colors Y, M and C is divided into two, one directly entering a selector 82 and the other one entering a smoothing circuit 81, where the data is subjected to smoothing processing. The smoothing processing is performed by a three by three smoothing matrix as shown in FIG. 11. That is, the average value of the densities of nine pixels in the three by three matrix is taken as the density of a target pixel.

The smoothed data is inputted to the selector 82. The selector 82 passes the data corresponding to any one of the three primary colors as it is if the result of the judgment by the character/dotted/picture area judging circuit 4A is not "dotted image area", while passing the smoothed data if it is "dotted image area". Consequently, smoothing processing is performed or is not performed depending on the result of the area judgment. When the smoothing processing is performed, occurrence of moiré in the dotted image area is restrained.

(3) Character/line area filter

FIG. 12 is a block diagram showing the construction of a principal part of the character/line area filter circuit 8B. Output data of the dotted image filter circuit 8A are subjected to strong, medium and weak edge emphases 91, 92 and 93 at three levels of intensity and are subjected to gray level adjusting processing 95 in order to emphasize the difference between the density of the target pixel and the densities of the pixels around the target pixel.

In the edge emphases, a three by three edge emphasis matrix is used, as shown in FIGS. 13A, 13B and 13C. The strongest edge emphasis is to multiply the density of a target pixel by 5 and multiply the densities of diagonal pixels around the target pixel by −1, then add the results of the multiplication, and further increase the result of the addition by 1.2 times, as shown in FIG. 13A. The result of the operation becomes the density value of the target pixel. The medium edge emphasis is to multiply the density of a target pixel by 5 and multiply the densities of diagonal pixels around the target pixel by −1, then add the results of the multiplication, and further increase the result of the addition by 1.0 time, as shown in FIG. 13B. The result of the operation becomes the density value of the target pixel. The weak edge emphasis is to multiply the density of a target pixel by 3.4 and multiply the densities of diagonal pixels around the target pixel by −0.6, and then add the results of the multiplication, as shown in FIG. 13C. The result of the operation becomes the density value of the target pixel.

When the data are subjected to the strong edge emphasis, level converting processing 94 is subsequently performed, as shown in FIG. 12. This processing is processing for emphasizing a black color in the character or line and replacing the values of the data C and Y with the value of the data M. Consequently, all the data Y, M and C attain the same level, whereby the black color is emphasized.

The gray level adjusting processing 95 is performed in parallel with the edge emphasizing processing. The lowest value out of the respective values of Y, M and C is detected, and each of the values of Y, M and C is replaced with the minimum value. It is possible to restrain a blur around the character or line by the gray level adjusting processing 95.

A selector 96 selects data to be passed, as in the following items (a) to (d), in accordance with the result of the judgment by the character/dotted/picture area judging circuit 4A.

(a) In a case where a judged area is judged to belong to a dotted image area and a character or line area (a character or line image in a dotted image area): the selector 96 passes data which has been subjected to the medium edge emphasis 92.

(b) In a case where a judged area is judged to belong to not a character or line area but a dotted image area: the selector 96 passes data which has been subjected to the weak edge emphasis 93.

(c) In a case where a judged area is judged to belong to not a dotted image area but a character or line area: the selector 96 passes data which has been subjected to the strong edge emphasis 91 and the level converting processing 94 with respect to pixels constituting a character or line image, while passing data which has been subjected to the gray level adjusting processing 95 with respect to pixels constituting an area around the character or line image. The level converting processing 94 is for emphasizing black color with respect to the pixels which have been judged to constitute a black character image. The judgment whether or not a pixel constitutes a black character image is performed by the character/dotted/picture area judging circuit 4 in accordance with a method known in the art.

(d) In a case where a judged area is judged to belong to neither a dotted image area nor a character or line area (a picture area): the selector 96 passes data which has been subjected to the weak edge emphasis 93.

By the foregoing processing, in the case of a character or line area which is a dotted image area, image data corresponding to the character or line image in the dotted image area are subjected to the medium edge emphasis after being subjected to the smoothing processing. Consequently, the occurrence of moire in the dotted image area, for example, is restrained, and the character or line image is emphasized to hold the sharpness of the character or line.

In the case of the mere dotted image area, image data corresponding to an image other than a character or line image in a dotted image area are subjected to the weak edge emphasis after being subjected to the smoothing processing. As a result, the change in the gray level attenuated by the smoothing processing can be returned to some extent, thereby making it possible to obtain a good image having no moiré.

In the case of a character or line area which is not in a dotted image area, image data corresponding to the character or line image are subjected to the strong edge emphasis and the level converting processing, whereby the sharpness of the character or line is emphasized. Moreover, it is possible to emphasize a black color in the character or line. In addition, the image data are subjected to the gray level adjusting processing with respect to the pixels constituting the area around the character or line image, thereby making it possible to erase a blur sticking out the character or line.

In the case of a picture area, image data corresponding to the picture area are subjected to the weak edge emphasis, thereby making it possible to emphasize the change in the gray level while preserving the medium gray level of a picture, whereby an image having a 3D effect is obtained.

Although the present invention has been described and illustrated in detail, it is clearly understood that the description is by way of illustration and example only and is not to be taken by way of limitation, the spirit and scope of the present invention being limited only by the terms of the appended claims.

What is claimed is:

1. An image processor for processing image data representing each of densities of a plurality of pixels constituting an image, comprising:

setting means for setting a detecting area including a predetermined number of pixels;

area judging means for judging whether the detecting area belongs to a dotted image area and whether the detecting area belongs to a character or line area on the basis of image data corresponding to the pixels in the detecting area set by the setting means;

smoothing means for subjecting image data corresponding to a pixel in an area which has been judged to belong to a dotted image area to smoothing processing; and character or line emphasizing means for subjecting image data corresponding to a pixel in an area which has been judged to belong to both a dotted image area and a character or line area to edge emphasizing processing, after the image data have been subjected to the smoothing processing by the smoothing means.

2. An image processor according to claim 1, further comprising means for subjecting image data corresponding to a pixel in an area which has been judged to belong not to a character or line area but to a dotted image area to edge emphasizing processing weaker than the edge emphasizing processing by the character or line emphasizing means.

3. An image processor according to claim 1, further comprising means for subjecting image data corresponding to a pixel constituting a character or line in an area which has been judged to belong not to a dotted image area but to a character or line area to edge emphasizing processing stronger than the edge emphasizing processing by the character or line emphasizing means.

4. An image processor according to claim 3, further comprising means for subjecting the image data corresponding to the pixel which is subjected to the strong edge emphasizing processing to level converting processing for emphasizing a black color.

5. An image processor according to claim 1, further comprising means for subjecting image data corresponding to a pixel around a character or line in an area which has been judged to belong not to a dotted image area but to a character or line area to gray level adjusting processing for restraining the density of the pixel.

6. An image processor according to claim 1, further comprising means for subjecting image data corresponding to a pixel in an area which has been judged to belong to neither a dotted image area nor a character or line area to edge emphasizing processing weaker than the edge emphasizing processing by the character or line emphasizing means.

7. An image processing method for processing image data representing each of densities of a plurality of pixels constituting an image, comprising the steps of:

setting a detecting area including a predetermined number of pixels;

judging whether the detecting area belongs to a dotted image area on the basis of image data corresponding to the pixels in the detecting area;

judging whether the detecting area belongs to a character or line area on the basis of image data corresponding to the pixels in the detecting area;

subjecting image data corresponding to a pixel in an area which has been judged to belong to a dotted image area to smoothing processing; and subjecting image data corresponding to a pixel in an area which has been judged to belong to both a dotted image area and a character or line area to edge emphasizing processing, after the image data have been subjected to the smoothing processing.

* * * * *